United States Patent
Fyke et al.

(10) Patent No.: US 8,457,692 B2
(45) Date of Patent: Jun. 4, 2013

(54) METHOD AND SYSTEM FOR PREVENTING DEVICE OPERATION WHEN DRIVING

(75) Inventors: Steven Henry Fyke, Waterloo (CA); David Ryan Walker, Waterloo (CA); Jerome Pasquero, Kitchener (CA)

(73) Assignee: Research In Motion Limited, Waterloo (CA)

(*) Notice: Subject to any disclaimer, the term of this patent is extended or adjusted under 35 U.S.C. 154(b) by 217 days.

(21) Appl. No.: 12/899,655

(22) Filed: Oct. 7, 2010

(65) Prior Publication Data

US 2012/0088446 A1 Apr. 12, 2012

(51) Int. Cl.
*H04M 1/00* (2006.01)

(52) U.S. Cl.
USPC ......... 455/569.2; 455/569.1; 455/1; 455/345; 455/565; 455/567; 340/5.64; 340/5.65

(58) Field of Classification Search
USPC ............ 455/569.2, 569.1, 1, 345, 565, 567; 340/5.64, 5.65
See application file for complete search history.

(56) References Cited

U.S. PATENT DOCUMENTS

| | | | |
|---|---|---|---|
| 5,796,827 A * | 8/1998 | Coppersmith et al. | 713/182 |
| 6,731,925 B2 * | 5/2004 | Naboulsi | 455/345 |
| 6,771,161 B1 * | 8/2004 | Doi et al. | 340/5.64 |
| 6,771,946 B1 | 8/2004 | Oyaski | |
| 7,123,874 B1 | 10/2006 | Brennan | |
| 7,187,953 B2 * | 3/2007 | Bauchot et al. | 455/569.2 |
| 2001/0006886 A1 * | 7/2001 | Suzuki | 455/63 |
| 2003/0096593 A1 * | 5/2003 | Naboulsi | 455/411 |
| 2004/0056758 A1 * | 3/2004 | Schwartz | 340/5.2 |
| 2008/0186282 A1 | 8/2008 | Nix et al. | |
| 2008/0255725 A1 | 10/2008 | Geisler et al. | |
| 2008/0268768 A1 | 10/2008 | Brown et al. | |
| 2008/0297336 A1 | 12/2008 | Lee | |
| 2009/0215466 A1 | 8/2009 | Ahl et al. | |
| 2010/0029203 A1 | 2/2010 | Hebiguchi et al. | |
| 2012/0214465 A1 * | 8/2012 | Piccionelli et al. | 455/418 |

FOREIGN PATENT DOCUMENTS

| | | |
|---|---|---|
| EP | 1961618 | 8/2008 |
| EP | 2 146 449 A1 | 1/2010 |
| EP | 2 182 660 A1 | 5/2010 |
| WO | 2009/081699 A1 | 7/2009 |

OTHER PUBLICATIONS

Jovanov et al., "A wireless body area network of intelligent motion sensors for computer assisted physical rehabilitation", Journal of NeuroEngineering and Rehabilitation, 2005, 2: 6 (Mar. 1, 2005).

(Continued)

*Primary Examiner* — Sanh Phu
(74) *Attorney, Agent, or Firm* — Ridout & Maybee LLP

(57) ABSTRACT

A method and system are presented for restricting the use of a portable electronic device by a driver who is operating a vehicle. A body area network (BAN) signal is sent from a vehicle device in the vehicle in close proximity to the driver. The BAN signal is transmitted using the driver's biological body as a signal transmission path. The portable electronic device includes a receiver configured to detect the BAN signal when the device is in close proximity to the driver. The portable electronic device is further configured to disable or restrict at least one function in response to detection of the BAN signal, thereby preventing or restricting use of the portable electronic device when the driver is seated in and operating the vehicle.

28 Claims, 8 Drawing Sheets

OTHER PUBLICATIONS

"Personalization", Red Tacton brochure, 2 pages; Source: Red Tacton, online: http://www.readtacton.com/en/field/03.html.

Julien Ryckaert, et al., "Ultra-Wide Band Transmitter for Wireless Body Area Networks", IMEC, Online: http://www.eurasip.org/proceedings/ext/ist05/papers/266.pdf, 4 pages.

Jordi Agud Ruiz, et al., A Study on the Transmission Characteristics of the Human Body Towards Broadband Intra-body Communications, IEEE Xplore, Consumer Electronics, 2005, (ISCE 2005), Proceedings of the Ninth International Symposium on Jun. 14-16, 2005, pp. 99-104.

"ALPS's 'Electric-Field Communication' Turns You into a Human Cable", CEATEC Japan 2009, Oct 7, 2009; pp. 1-8; Source: Gigazine, online: http://en.gigazine.net/index.php?/news/comments/20091006_alps_ceatec_japan_2009/.

Pilcher, James, "Inventors' device blocks cell use around driver", The Cincinnati Enquirer, (Updated: Apr. 14, 2009) Source: USAToday, online: http://www.usatoday.com/money/autos/2009-04-13-inventor-block-cellphone_N.htm.

Safe Driving Systems, Product FAQs, Source: Safe Driving Systems, online: http://safedrivingsystems.com/support/product-faq/.

"Car Key Jams Teen Drivers' Cell Phones and Texting", University of Utah (Dec. 10, 2008), Source: Newswise, online: http://www.newswise.com/articles/view/547297.

"DriveAssist Overview: Manage Mobile Phone Use While Driving", Source: Aegis Mobility, online: http://www.aegismobility.com/home/solutions/driveassist-overview.

Zimmerman TG, "Personal Area Networks: Near-Field Intrabody Communication" IBM Systems Journal, IBM Corp., Armonk, New York, USA, vol. 35, No. 3/04, Jan. 1, 1996, pp. 609-617.

Extended European Search Report dated Apr. 5, 2011.

* cited by examiner

METHOD AND SYSTEM FOR PREVENTING DEVICE OPERATION WHEN DRIVING

TECHNICAL FIELD

The present disclosure relates to portable electronic devices and in particular relates to a system and method to prevent a driver from using the portable electronic device while operating a vehicle.

BACKGROUND

There is a need to prevent or restrict the use of a portable electronic device by a person who is operating a vehicle. A conventional solution for preventing a driver from using a portable electronic device while driving involves sending a jamming signal throughout the vehicle. The problem with this solution is that it also prevents any passengers in the vehicle from using a portable electronic device. Another conventional solution involves pairing the car key with the portable electronic device so that the driver is prevented from using the mobile device when the car is on. A problem with this solution is that it only prevents the driver from using the portable electronic device that is paired with the car key.

DETAILED DESCRIPTION OF EXAMPLE EMBODIMENTS

Figure 1:
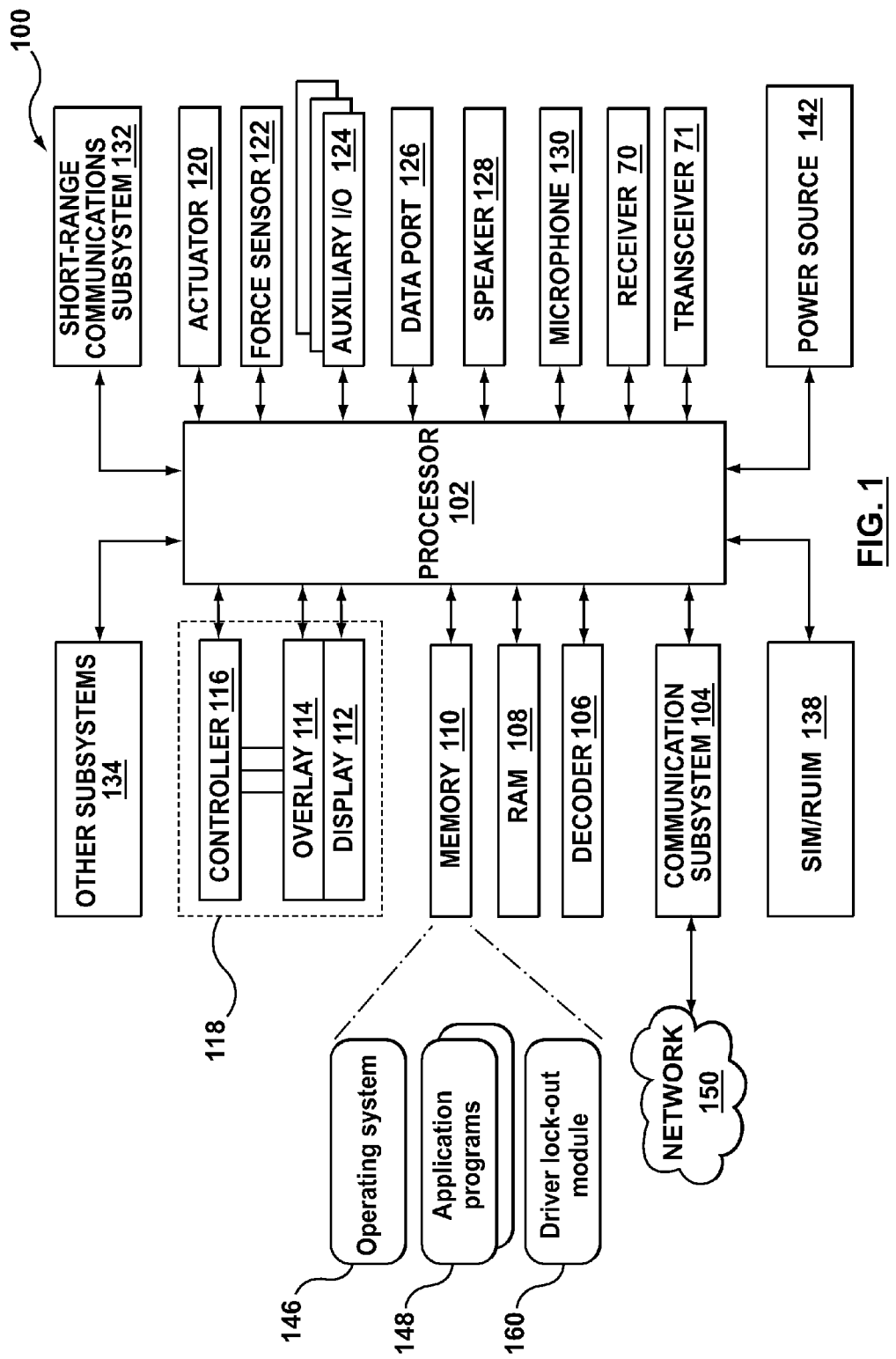
FIG. 1 is a simplified block diagram of components of a portable electronic device in accordance with one example embodiment of the present disclosure.

For simplicity and clarity of illustration, reference numerals may be repeated among the figures to indicate corresponding or analogous elements. Numerous details are set forth to provide an understanding of the example embodiments described herein. In other instances, well-known methods, procedures, and components have not been described in detail to avoid obscuring the embodiments described. The description is not to be considered as limited to the scope of the embodiments described herein.

The present disclosure provides a method of restricting the use of a portable electronic device by a driver who is operating a vehicle. A signal is sent from a vehicle device indicating that the driver is operating the vehicle. The signal is transmitted to the portable electronic device using a biological body as a signal transmission path. When the driver is in contact with, or in close proximity to, the transmitter and in contact with, or in close proximity to, a portable electronic device, the portable electronic device detects the signal and restricts its functionality in response.

In accordance with one embodiment of the present disclosure, there is provided a method for restricting the use of a portable electronic device by a driver of a vehicle. The method includes transmitting a signal configured to be transmissible over a body area network (BAN) using a vehicle device; receiving the signal at the portable electronic device through a receiver in the device, the receiver receiving the signal after transmission through the BAN; and carrying out an action responsive to the received signal.

In accordance with another embodiment of the present disclosure, there is provided a system for restricting the use of a portable electronic device in a vehicle. The system includes a vehicle device within the vehicle, configured to transmit a body area network (BAN) signal, the vehicle device including a BAN electrode mounted in the vehicle in a location having close proximity to a driver the driver is operating the vehicle; and a controller connected to the BAN electrode and configured to generate and transmit the BAN signal through the BAN electrode.

In accordance with a further embodiment of the present disclosure, there is provided a portable electronic device including a processor; a receiver, connected to the processor, and configured to receive a body area network (BAN) signal via a body area network; a driver lock-out module having computer-executable instructions which, when executed, configure the processor to: detect receipt of the BAN signal at the receiver and, in response to detection of receipt of the BAN signal, disable at least one function of the portable electronic device.

In accordance with another embodiment of the present disclosure, there is provided a vehicle device for restricting the use of a portable electronic device in a vehicle, comprising: a BAN electrode mounted in the vehicle in a location having close proximity to a driver the driver is operating the vehicle; and a controller connected to the BAN electrode and configured to generate and transmit a BAN signal through the BAN electrode.

In accordance with yet another embodiment of the present disclosure, there is provided a method for restricting the use of a portable electronic device by a driver of a vehicle. The method includes receiving, at a vehicle device, an indication that the vehicle is in operation; and in response to receiving the indication, transmitting a signal configured to be transmissible over a body area network (BAN) using the vehicle device to the portable electronic device.

The disclosure generally relates to an electronic device, which is a portable electronic device 100 in the embodiments described herein. Examples of portable electronic devices 100 include mobile, or handheld, wireless electronic devices such as pagers, cellular phones, cellular smart-phones, wireless organizers, personal digital assistants, wirelessly enabled notebook computers, and so forth. The portable electronic device 100 may also be a portable electronic device 100 without wireless electronic capabilities, such as a handheld electronic game device, digital photograph album, digital camera, or other device.

The present description of example embodiments does not limit implementation to any particular computer programming language or system architecture. Embodiments described in the specification are not limited to any particular operating system (OS), mobile device architecture, server architecture, or computer programming language.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communication. A power source 142, such as one or more rechargeable batteries or a port to an external power supply, powers the portable electronic device 100.

The processor 102 may interact with other components, such as Random Access Memory (RAM) 108, memory 110, a display screen 112 (such as a liquid crystal display (LCD)) with a touch-sensitive overlay 114 operably connected to an electronic controller 116 that together comprise a touch-sensitive display 118, one or more actuators 120, one or more force sensors 122, one or more auxiliary input/output (I/O) subsystems 124, a data port 126, a speaker 128, a microphone 130, short-range communication subsystem 132, and other device subsystems 134.

The device 100 may further include a receiver 70 for receiving signals sent over a body area network (BAN), as will be described in detail below. The receiver 70 may include an electrode or antenna, in some cases exposed on the exterior of the casing of the device, and related circuitry for receiving, detecting and processing signals from the electrode or antenna.

In this example embodiment, user-interaction with a graphical user interface (GUI) is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device 100, is displayed on the touch-sensitive display 118 via the processor 102. In other examples the device 100 may have additional user-interface components, such as a keyboard, keypad, trackball, trackwheel, touchpad, or other such devices for receiving input. In some embodiments, the display 112 may not be a touchscreen.

To identify a subscriber for network access, the portable electronic device 100 uses a Subscriber Identity Module or a Removable User Identity Module (SIM/RUIM) card 138 for electronic with a network, such as the wireless network 150. Alternatively, user identification information may be programmed into memory 110.

The portable electronic device 100 includes an operating system 146 and software applications or programs 148 that are executed by the processor 102 and are typically stored in a persistent, updatable store such as the memory 110. Additional applications or programs 148 may be loaded onto the portable electronic device 100 through the wireless network 150, the auxiliary I/O subsystem 124, the data port 126, the short-range electronic subsystem 132 or any other suitable subsystem 134. In one embodiment, the operating system 146 and/or the software applications 148 include a driver lock-out module 160 configured to restrict the functionality of the portable electronic device 100 in response to receiving a signal that the device 100 is in close proximity to a driver operating a vehicle.

The term "close proximity" as used herein means direct physical contact with the skin of a user/driver or sufficiently close to enable BAN communication. In some cases, "close proximity" is within about 2 centimeters. The degree of separation permissible for a given embodiment may vary dependent upon the power, frequency, and other characteristics of the transmitter, receiver and antenna, as will be appreciated by those ordinarily skilled in the art from a review of the following description.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communication, the overall operation of the portable electronic device 100 is similar. The speaker 128 outputs audible information converted from electrical signals, and the microphone 130 converts audible information into electrical signals for processing.

Figure 2:
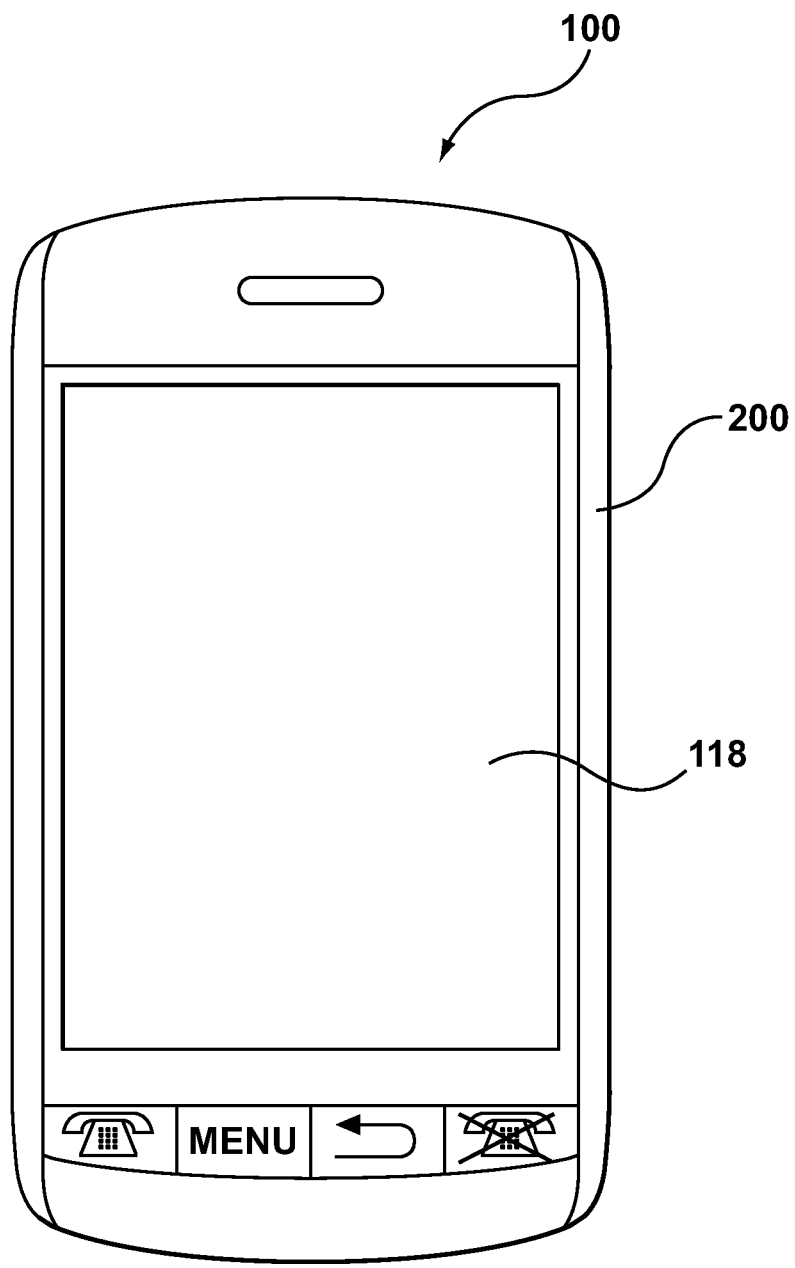
FIG. 2 is a front view of an example of a portable electronic device 100 in a portrait orientation.

FIG. 2 shows a front view of an example of a portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The auxiliary I/O subsystems 124 could include other input devices such as one or more control keys, a keyboard or keypad, navigation device, or any combination thereof. The navigation device may be a depressible/clickable trackball, a depressible/clickable scroll wheel, a touch-sensitive optical trackpad, or a touch-sensitive touchpad.

In yet other embodiments, a conventional display screen may be provided instead of the touch-sensitive display 118. In such embodiments, input may be provided via one or more control keys, a keyboard or keypad, navigation device or any combination thereof.

Figure 4:
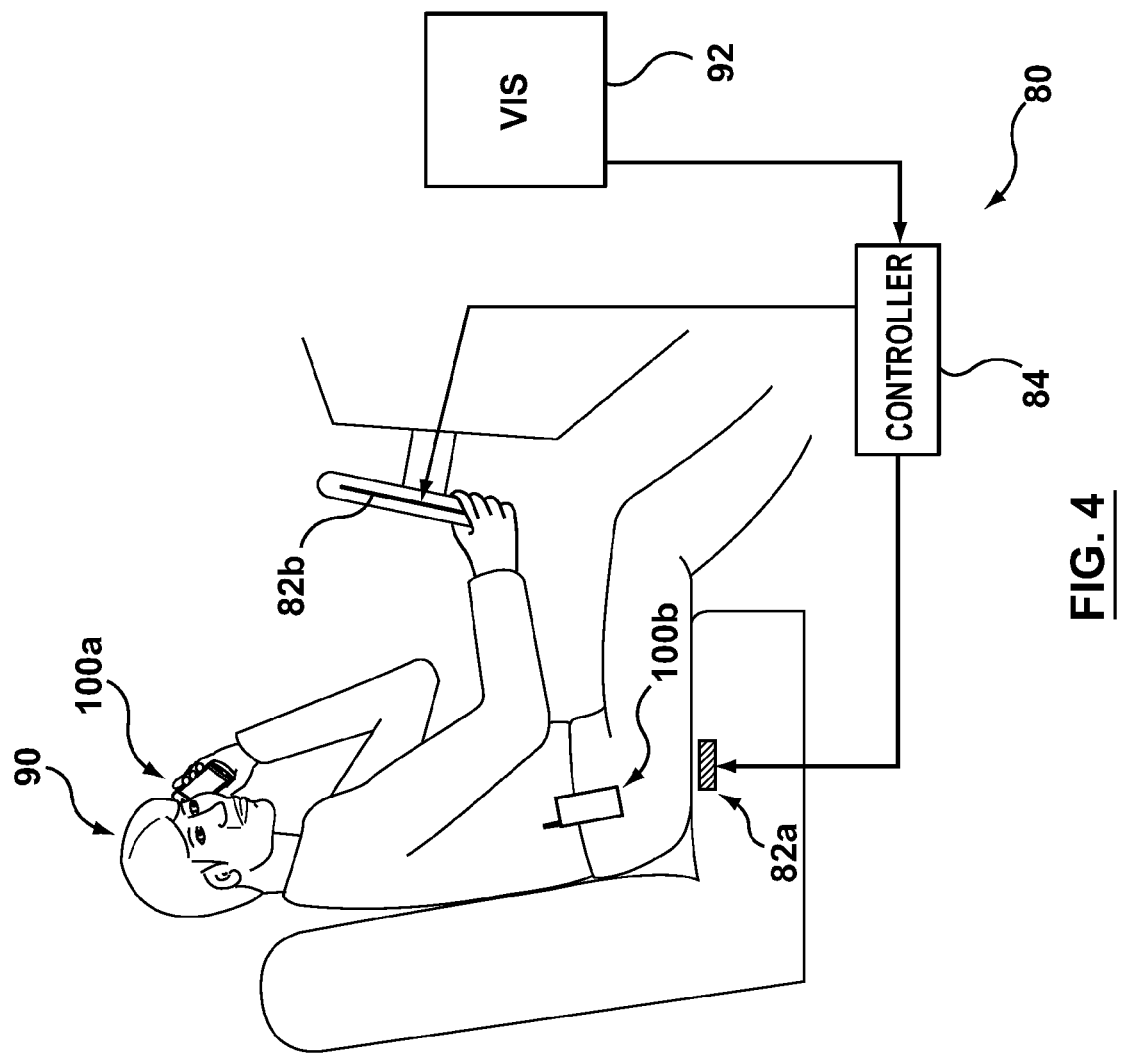
FIG. 4 is a diagram of a system for restricting the use of a portable electronic device by a driver who is operating a vehicle in accordance with one example embodiment of the present disclosure.

FIG. 4 shows a diagram of a system for restricting the use of a portable electronic device 100 by a driver who is operating a vehicle. In this example illustration, a driver 90 is operating a vehicle. The driver 90 is shown with two portable electronic devices 100 (individually labelled 100*a* and 100*b*). One of the devices 100*a* is in the driver's hand being used in an active call. The other device 100*b* is being worn on the driver's belt loop. The device 100*b* may be held in a case configured to be attached to a belt or other item of clothing. In some cases, the device 100 may be carried in a pocket or elsewhere on the driver 90.

The system includes a vehicle device 80 for generating and transmitting a BAN signal. The vehicle device 80 includes at least one transmitter. The vehicle device 80 may include an antenna or electrode 82 (shown individually as 82*a*, 82*b*). In one example, the electrode 82*a* may be placed in the base of a driver's seat. In another example, the electrode 82*b* may be placed in the steering wheel. Other locations within the vehicle are possible provided they result in the electrode being in close proximity with the driver when the driver is operating the vehicle. In the case of the steering wheel, the driver 90 typically grasps the steering wheel with one or both hands when driving, sometimes with direct skin contact to the steering wheel (unless gloves are worn). In the case of the seat, the driver 90 is typically in close proximity to an electrode in the seat whenever seated in the driver's seat.

Existing metal components within the steering wheel or base of the driver's seat of a vehicle may act as an antenna or electrode for the vehicle device 80. There may be other areas of the vehicle that the vehicle device 80 may be located where it will be in close proximity to the driver while the driver is operating the vehicle.

The vehicle device 80 further includes a controller 84. The controller 84 generates the BAN signal for driving the antenna or electrode 82. The controller 84 may, in some embodiments, generate and transmit the signal whenever the vehicle is operating. The controller 84 may be configured to receive a signal from a vehicle information system (VIS) 92 indicating whether the vehicle is operating. The VIS may include an on-board diagnostic system, vehicle computer system, or any suitable vehicle signal line. For example, the VIS 92 may include a signal indicating whether the vehicle engine is running. In another example, the VIS 92 may provide a signal indicating whether the vehicle is in gear or parked. In yet another example, the VIS 92 may provide a signal indicating a vehicle speed or whether the vehicle is travelling above a threshold speed. Other signals may also indicate whether the vehicle may be considered to be operating.

In another embodiment, the vehicle device 80 does not receive signals from the VIS 92. In this embodiment, the vehicle device 80 may detect motion of the vehicle through signals received from a GPS device that is in the vehicle, but that is external to the vehicle's built-in electronic system. Upon receiving signals from the GPS device indicating that the vehicle is in motion, the vehicle device 80 may send a 'restricted mode' signal to the portable electronic device 100 over the BAN.

In some embodiments, the controller 84 may include a fixed logic device. In other embodiments requiring increased functionality, the controller 84 may include an embedded computer system with downloadable or dynamically programmable modules.

The vehicle device 80 uses a BAN to communicate with the portable electronic device 100. The BAN utilizes the surface of the biological body, the driver 90, as a signal transmission path. In one example embodiment, the BAN 50 is achieved using electrical capacitive coupling. The capacitive coupling is formed through a capacitor between the vehicle device 80 and the transmission medium, e.g. driver 90, and a capacitor between the receiver 70 and the transmission medium (driver 90). As a result of the coupling, the signal is converted into an electric field at the vehicle device 80 and then transmitted through the transmission medium (the driver 90) to the receiver 70.

In some embodiments, the portable electronic device 100 contains at least one BAN transceiver 71 and the vehicle device 80 contains at least one BAN transceiver 83 to facilitate two-way communication between the portable electronic device 100 and the vehicle device 80. Additionally, the vehicle device 80 may further include multiple BAN transmitters and transceivers, additional sensors, such as a GPS module, or other I/O ports, including its own wireless communications subsystem, or any combination thereof. The wireless communications subsystem may allow commands to be issued to the vehicle device 80 directly from a central control point, permitting instant modification of the restricted modes and the ability to shut down the portable electronic device 100 if necessary. The vehicle device 80 may also further include an I/O port for interfacing with the vehicle's electronic system.

Figure 5:
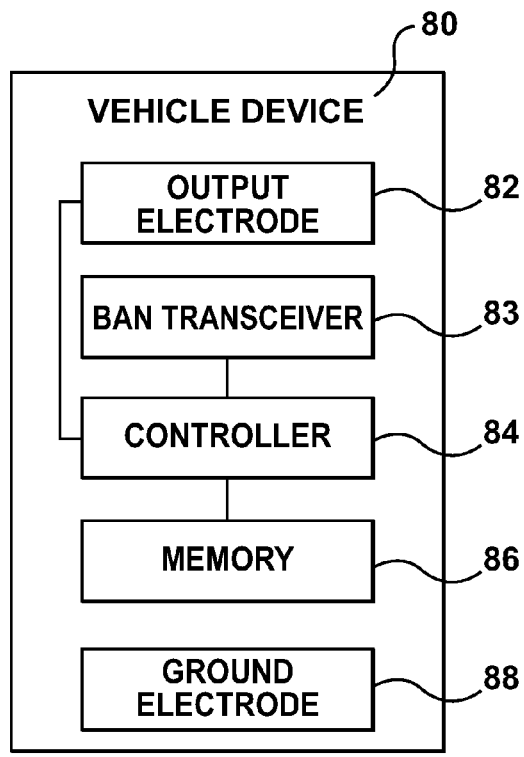
FIG. 5 is a schematic diagram showing a vehicle device in accordance to an example embodiment of the present disclosure.

Reference is now made to FIG. 5, which shows an example embodiment of the vehicle device 80. The vehicle device 80 in this example includes electrode 82, a ground electrode 88, and the controller 84.

The output electrode 82 is connected to and driven by the controller 84. The controller 84 generates a BAN signal. The BAN signal may contain information, such as an identification signal of the vehicle device 80. The vehicle device 80 may further comprise a memory 86 that stores an identification signal of the vehicle device 80 and/or other information that may be sent in the BAN signal. The controller 84 may be configured to generate and modulate a carrier wave using the information signal. The modulated signal is then output from the controller 84 to the output electrode 82.

In this example embodiment, the output electrode 82 is electric field coupled to the transmission medium (i.e. driver 90), resulting in the modulated signal being transmitted from the output electrode 82 to the electric field of the driver 90. The ground electrode 88 of the vehicle device 80 is electric field coupled to the ground and is electric field coupled to a ground electrode of the receiver 70 through the ground, forming a closed communication loop as a whole. The vehicle device 80 may further comprise a conversion circuit (not shown) configured to amplify the modulated signal and convert the amplified signal into a voltage change.

As previously discussed, the vehicle device 80 may modulate the carrier wave using the information signal. Various standard modulation methods may be used, such as amplitude modulation (AM), frequency modulation (FM), phase-shifting keying (PSK) etc. The carrier wave is of a frequency at which the biological body exhibits conductivity. The IEEE P802.15 Task Group 6 Working Group for Wireless Personal Area Networks (WPANs) has conducted research regarding channel models for BANs. The Working Group has explored the particular scenario of a body surface to body surface BAN; where the term body surface is considered to be a node or device on the surface of human skin or at the most 2 cm away. The system of the present disclosure may be characterized as a body surface to body surface BAN as the vehicle device 80 and the portable electronic device 100 must be within close proximity of the driver 90 in order to transmit and receive signals over the BAN.

The potential carrier frequency used for a BAN may range from several tens of kHz to several tens of MHz, depending on the implementation. The BAN signal is transmitted in a frequency band that the portable electronic device 100 is configured to detect using receiver 70. In one specific embodiment, the BAN carrier wave has a frequency of 10.7 MHz. The portable electronic device 100 may be configured to disable one or more of its functions in response to receipt of a BAN signal.

As indicated above, the BAN signal may be generated by the controller 84 of the vehicle device 80 dependent on the state of the vehicle. In another embodiment, the information signal modulating the BAN carrier is dependent upon the state of the vehicle. For example, a particular information signal may be generated when the vehicle is in motion over a predetermined speed, and a different information signal is generated when the ignition of the vehicle is on. Other states of the vehicle may result in a particular information signal being generated by the controller 84. In response to the particular state of the vehicle, the portable electronic device 100 may be configured to restrict access to all or only portions of its functionality.

In an example embodiment of the system, a biological body, the driver 90, acts as the transmission medium, for the BAN signal sent by vehicle device 80. The BAN signal is supplied by the vehicle device 80 to the driver as an electric field. In an embodiment, a voltage change is applied to the output electrode 82 of the vehicle device 80, generating an electric field corresponding to the modulated information signal near the output electrode 82. The electric field is then applied to the biological body, in this instance the driver 90, and uses the surface of the biological body as the signal transmission path.

Figure 6:
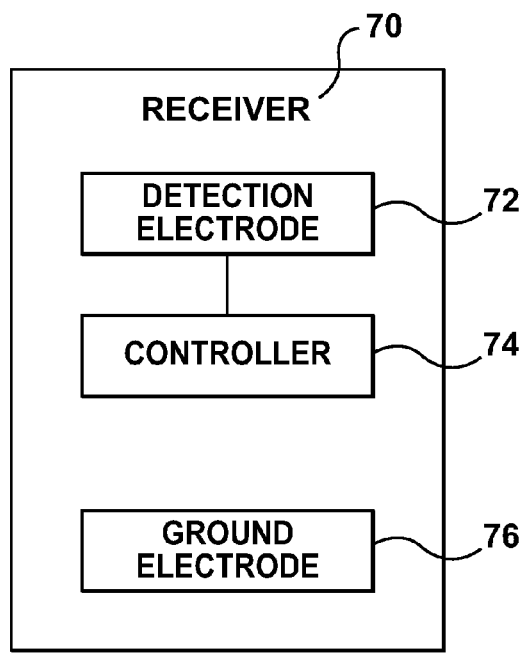
FIG. 6 is a schematic diagram showing a receiver of the portable electronic device in accordance to an example embodiment of the present disclosure.

The signal from the vehicle device 80 is transmitted across the surface of the skin of the driver 90 when the driver 90 is in close proximity with the vehicle device 80. As the vehicle device 80 uses very low frequency and power, the vehicle device 80 signal does not propagate far beyond the skin surface of the driver 90. As a result, the range of the BAN around the driver 90 is short. In order for the capacitive coupling to operate, close proximity between the driver 90 between and the vehicle device 80 (specifically the antenna or electrode 82), and close proximity 90 between the driver and the portable electronic device 100 is required. In some embodiments, the signal may be transmitted from the vehicle device 80 to the driver through clothing or other thin physical barriers that may exist between the driver and the antenna or electrode 82 (for example, through gloves or other clothing). In some embodiments, due to attenuation of the signal closer proximity between the driver 90 and the portable electronic device 100 may be needed as compared to proximity between the driver 90 and the transmitter's electrode 82. In some embodiments, the BAN signal may be detected by the receiver 70 of the electronic device 100 only if the driver 90 physically touches the device 100, or at least comes in very close proximity (i.e. within millimeters, such that contact with a gloved hand will result in detection of the BAN signal, but wearing the device 100 on a belt loop within a casing will not). As noted previously, the frequency, power, antenna/electrode design and positioning and other details of implementation may impact the proximity necessary to transmit the BAN signal in a particular embodiment. Reference is now made to FIG. 6, which shows a block diagram of the receiver 70 within the portable electronic device 100. The receiver 70 includes a detection electrode 72 configured to detect the electric field occurring around the driver 90. The detection electrode 72 for the BAN signal may be provided on at least one of the sides or faces of the portable electronic device 100. The detection electrode 72 may contain a sensing element that converts a detected field into an electric signal. The receiver 70 may further comprise a controller 74, electrically connected to the detection electrode 72, to amplify and, in some cases, demodulate the detected signal. In one embodiment, the controller 74 may demodulate the received signal to recover an information signal. In one embodiment, the information signal may specify the identification of the vehicle device 80 sending the information signal. The receiver 70 may further include a ground electrode 76 for the BAN communication, which in some embodiments may be electric field coupled to the ground.

Figure 3:
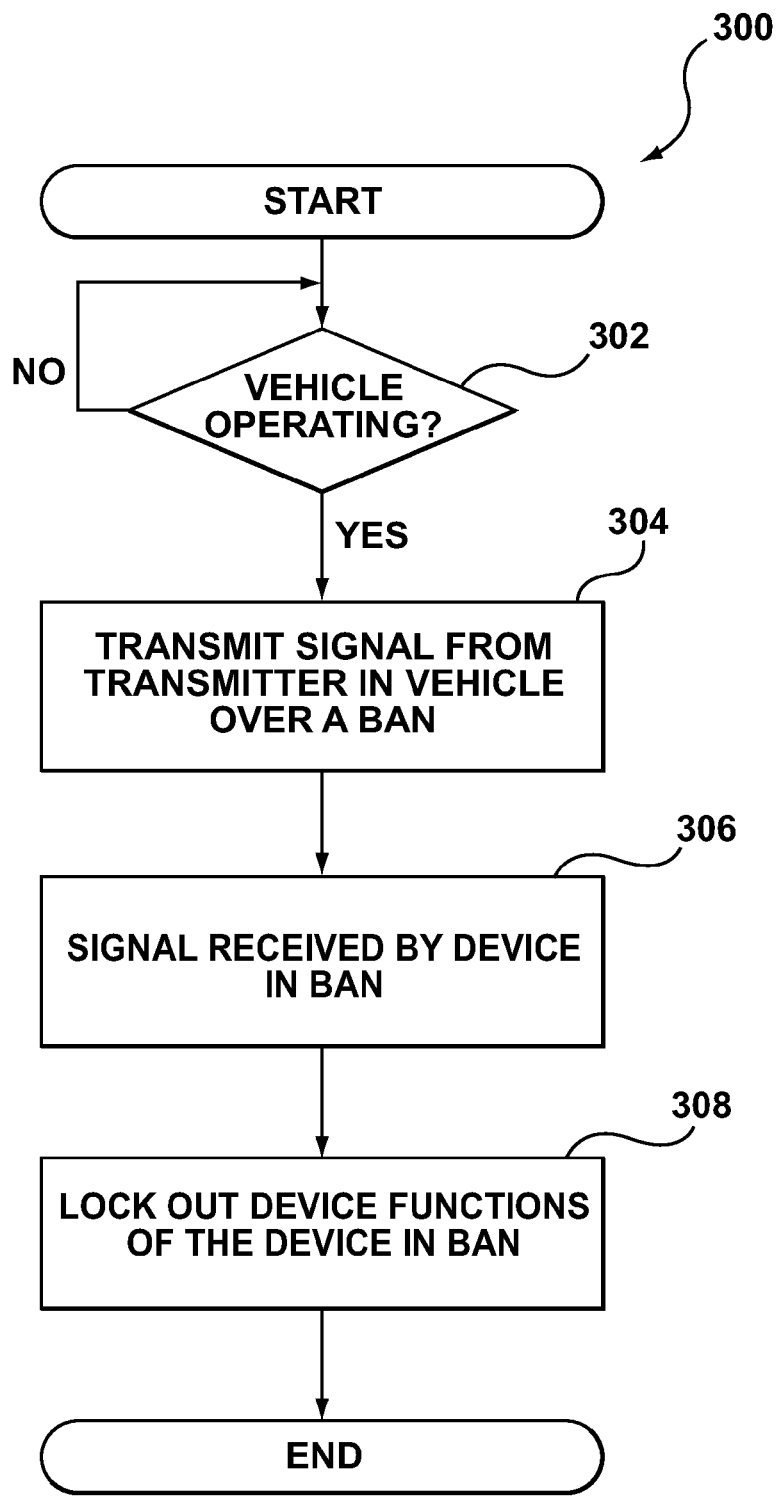
FIG. 3 is a flowchart illustrating a method of restricting the use of a portable electronic device by a driver who is operating a vehicle in accordance with one example embodiment of the present disclosure.

FIG. 3 illustrates an example method for restricting the use of an electronic device by a driver of a vehicle. The method begins with determining, at the vehicle, if the vehicle is in operation (block 302). In an embodiment, the vehicle may be in operation if, for example, a control signal from the vehicle indicates the ignition has started, the vehicle has been place in gear, or a predetermined speed has been reached. Other control signals indicating the vehicle's status of operation may be used to indicate that the vehicle is in operation. Once the vehicle device 80 determines that the vehicle is in operation, the vehicle device 80 is activated and transmits the BAN signal (block 304).

The BAN signal is sent from the vehicle device 80 (block 304). The BAN is formed using the driver as a transmission medium when the driver is in close proximity to the vehicle device 80. As previously discussed, the signal of the BAN does not propagate far from the biological body.

The portable electronic device 100 receives the BAN signal through the BAN when the portable electronic device 100 is in close proximity to the driver (block 306). The portable electronic device 100 carries out an action in response to receiving the BAN signal indicating that the driver is operating the vehicle (block 308).

There are various possible actions that are carried out by the portable electronic device 100 in response to receiving the BAN signal. The action may include storing the BAN signal on the portable electronic device 100 for future use, reference or processing by the portable electronic device 100. The action carried out by the portable electronic device 100 may also include entering a restricted mode of operation. As well, the action may involve triggering a warning to be sent to the UI of the portable electronic device 100 indicating to the user that the device will be entering a restricted mode. The warning may include an audio warning, vibration of the portable electronic device 100, or screen images on the portable electronic device 100. The screen images may indicate that the restricted mode will occur after a predetermined amount of time from when the warning was sent or that it will occur after a detectable change in the state of the vehicle.

The processor 102 on portable electronic device 100 processes the received signal. The signal may have a signature or identifiable characteristic such that the portable electronic device 100 is able to identify the BAN signal. The driver lock-out module 160 configures the processor 102 to disable prescribed functions, applications, or features of the device 100. For example, in one embodiment, the driver lock-out module 160 may be configured to disable the device's communication subsystem 104 so as to prevent incoming and outgoing communications, including voice calls and messages. In another embodiment, the driver lock-out module 160 may disable application programs or may restrict the functionality of certain application programs. For example, the lock-out control module 160 may cause a phone application to default to voice-activated dialing and speakerphone mode when the vehicle is in operation. In addition to the specific combinations of mobile device functionality and applications disclosed herein as being enabled or disabled, all combinations of mobile device functionality and/or applications on a mobile device may be grouped and controlled (enabled or disabled) using the methods disclosed.

As previously discussed, the information signal may be dependent on the state of the vehicle such that there is a unique information signal depending on whether the vehicle is being driven at a speed greater than a predetermined speed, the vehicle is reversing etc. The driver lock-out module 160 may configure the processor 102 to perform different restrictive operations depending on the detected operational state of the vehicle. For example, there may be different restrictive modes for the portable electronic device 100 depending on whether the vehicle is on and parked versus on and in gear.

The restricted mode may prevent the driver from using the portable electronic device 100 to make phone calls, to send text or other electronic messages. In another embodiment, the restricted mode may prevent the driver from receiving any calls or messages. In an embodiment, the sending or receiving of calls or messages may be restricted except for emergency functions. In this embodiment, the driver may be able to call or message emergency services while other functionality of the portable electronic device 100 is restricted. In another embodiment, the signal received may result in the portable electronic device 100 entering into a hands-free mode, such that the driver may only use the phone in this manner. In another embodiment, the control signal may cause the portable electronic device 100 to completely shut down such that the driver may not use the portable electronic device 100 at all. As well, there may be other functionality of the portable electronic device 100 that is restricted in response to receiving the BAN signal from the vehicle device 80.

Figure 7:
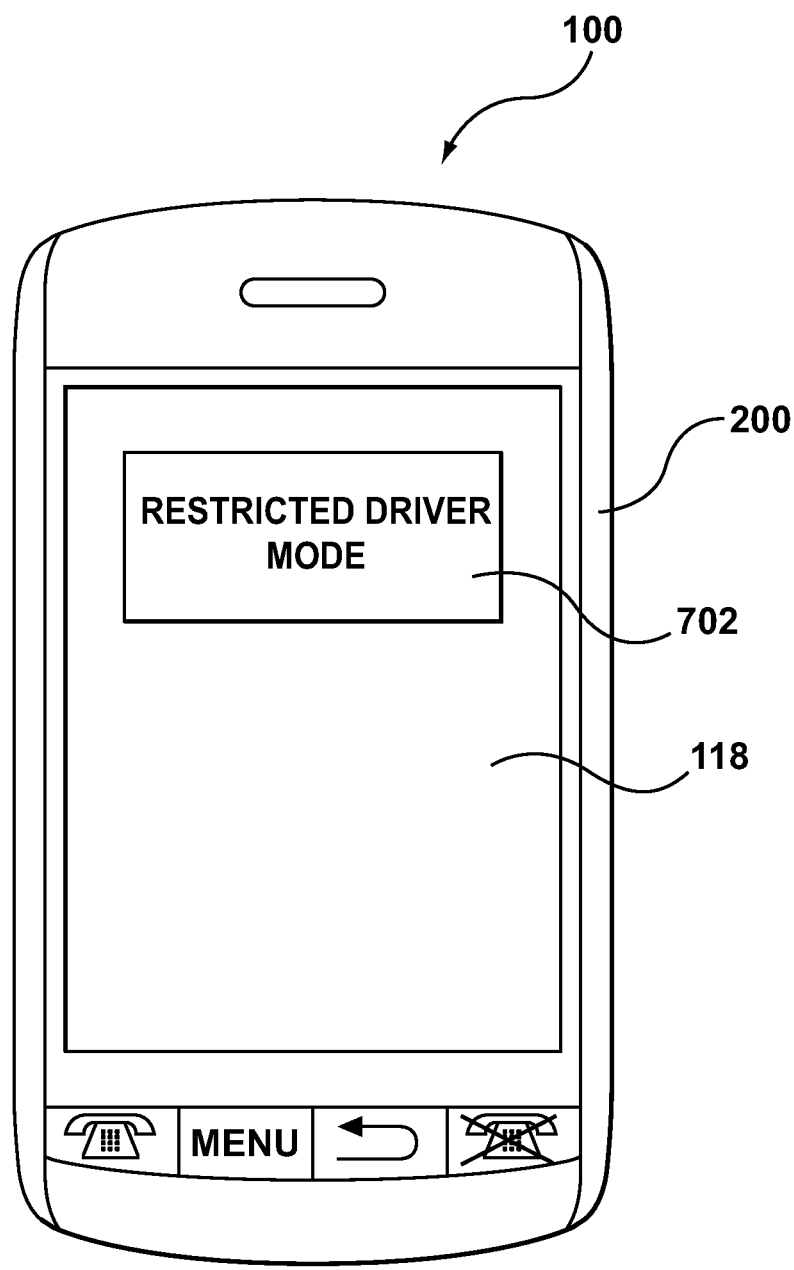
FIG. 7 is a front view of an example visual indicator indicating a restricted driver mode on a portable electronic device 100 in a portrait orientation.

FIG. 7 illustrates an embodiment where a visual indicator is displayed on the user interface of the portable electronic device 100 when the portable electronic device 100 is subject to the restricted mode. This indicates to the user that the portable electronic device 100 is currently subject to the restricted mode and that at least some functionality of the portable electronic device 100 is restricted. There may be different visual indicators corresponding to the different restricted modes of the portable electronic device 100. As well, the visual indicator may be a symbol instead of the example visual message 702 displayed on the portable electronic device 100 shown in FIG. 7. Additionally, an event may be triggered when a user tries to use a prohibited function on the portable electronic device 100. For example, the event may be an audio indicator, visual indicator or vibration of the portable electronic device 100. The event indicates to the user that the function they are attempting to use is currently restricted on the portable electronic device 100.

Figure 8:
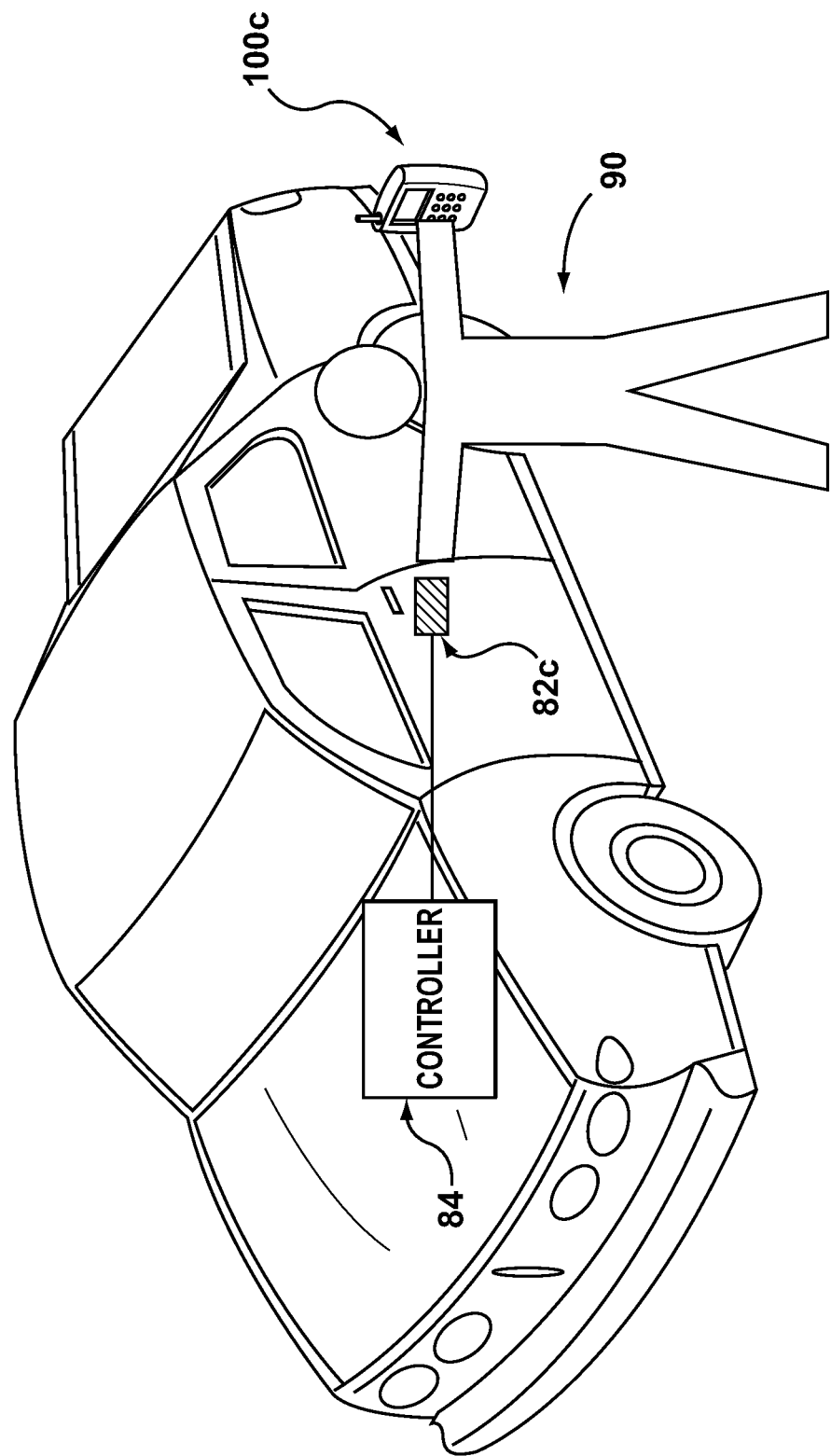
FIG. 8 is a diagram of a system for restricting the use of a portable electronic device by a driver who is operating a vehicle in accordance with another example embodiment of the present disclosure.

FIG. 8 illustrates another embodiment where additional vehicle transmitters 82c may be mounted on the exterior of the vehicle, for example a door handle. When a person touches the door handle, the controller 84 of the vehicle device 80 will communicate with the portable electronic device 100c that the portable electronic device 100c may be placed in a restricted mode. That is the vehicle device 80 will send a warning signal to the portable electronic device 100. The warning signal may cause an audio, visual or vibrational alert to be executed on the portable electronic device 100c. This alerts the user of the portable electronic device 100c that the portable electronic device 100c is going to enter a restricted mode of operation and to conclude other uses of the portable electronic device 100c before proceeding into the vehicle. This allows the user to complete any tasks on the portable electronic device 100c before the restricted mode is set due to actions such as the user sitting in the vehicle, starting the vehicle, engaging the transmission or the vehicle being in motion. Other locations on the exterior of the vehicle are possible provided they result in the BAN transmitter being in close proximity with the driver before the driver enters the vehicle.

In an embodiment where there is only one transmitter and it is located inside the vehicle, the first signal transmission of the vehicle device 80 is a warning signal. The warning signal results in an alert being executed on the portable electronic device 100 to inform the user that the portable electronic device 100 will soon be entering a restricted mode. The alert may be in the form of a visual alert on the user interface of the portable electronic device 100. The visual alert may specify the amount of time before the portable electronic device 100 enters the restricted mode, or it may specify what vehicle action will trigger the portable electronic device 100 to enter the restricted mode. As previously discussed, vehicle actions may include starting the vehicle, engaging the transmission or moving the vehicle.

Due to the short range of the BAN, portable electronic devices 100 that are not in close proximity to the driver 90 do not receive the BAN signal. A portable electronic device 100 that is located outside the BAN will be fully operational. For example, any passenger in the vehicle may use a portable electronic device 100 while the vehicle is in operation.

Any portable electronic device 100 within the BAN will receive the signal and operate to restrict functionality will the driver is operating the vehicle. For example, if the driver holds a passenger's portable electronic device 100 while operating the vehicle, and the passenger's portable electronic device 100 includes the receiver 70 described above, the functionality of the passenger's portable electronic device 100 will be restricted whilst in the possession of the driver 90.

Figure 9:
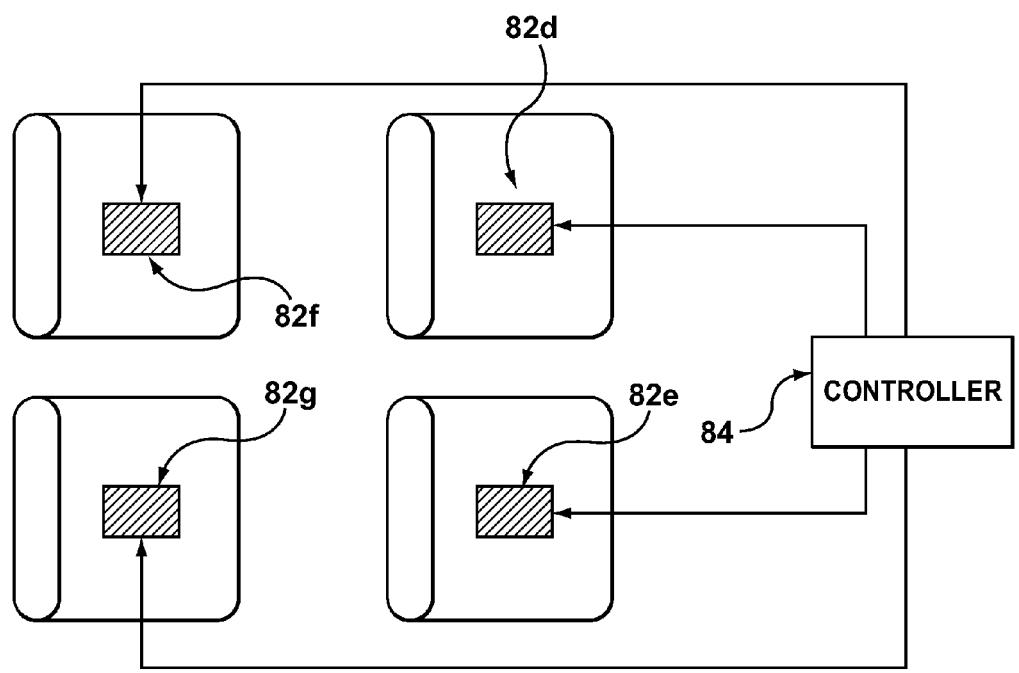
FIG. 9 is a diagram of a system for restricting the use of a portable electronic device by a driver who is operating a vehicle in accordance with a further example embodiment of the present disclosure.

In some embodiments, the vehicle device 80 may have multiple transmitters and/or transceivers located near every vehicle occupant, including both the driver and passengers. FIG. 9 illustrates transmitters 82d, 82e, 82f, and 82g underneath each of the seats in the vehicle. The vehicle device 80 will be programmed with a plurality of modes that it may send to the one or more portable electronic devices 100 located in the vehicle. Different restricted modes will be sent to the portable electronic devices 100 of different occupants. The modes may be classified as driver modes (D-mode) and passenger modes (P-mode), and there may be multiple modes for each classification. The passenger modes will typically include minor restrictions, such as disabling any camera on the portable electronic device 100. The use of particular modes allows the selective restriction of functionality of portable electronic devices 100 to be used in restricted areas, such as military bases, for all vehicle occupants.

The table below illustrates example driver modes and passenger modes and the corresponding functionality of the portable electronic device 100 that is disabled. Where there is a 'Y' in the table, the corresponding functionality is disabled. Where there is a 'N' in the table, the corresponding functionality is still enabled and may be used by the user. For example, the restricted mode D-mode 1 will disable all functionality of the portable electronic device 100 except for emergency calls and voice activated calls. In another example restricted mode, P-mode 1 will disable only the camera and IM functionality of the portable electronic device 100. The table is illustrative only and additional functionality of the portable electronic device 100 may be enabled or disabled according to a particular restrictive mode.

|  | D-mode 1 | D-mode 2 | D-mode 3 | P-mode 1 |
| --- | --- | --- | --- | --- |
| Disable mobile device entirely | Y | N | N | N |
| No calls at all | Y | N | N | N |
| Send/receive only emergency calls | N | Y | N | N |
| Voice activated calls only | N | N | Y | N |
| No Camera | Y | Y | N | Y |
| No IM | Y | Y | Y | Y |
| No Web connection/browsing | Y | Y | Y | N |
| No Email | Y | Y | Y | N |
| No Calendar applications | Y | Y | Y | N |

The portable electronic device 100 remains in the restricted mode while it continues to receive the BAN signal from the vehicle device 80. In one embodiment, the receiver 70 on the portable electronic device 100 polls periodically to determine whether it is still receiving a BAN signal from the vehicle device 80. The polling may be performed according to a predetermined duration, such as every few seconds to see whether it is receiving the BAN signal. If the portable electronic device 100 is still receiving the BAN signal, then the portable electronic device 100 remains in the restrictive functionality mode. If the portable electronic device 100 polls and no longer detects the BAN signal, then the device is out of the range of the BAN. Once out of range of the BAN signal, the portable electronic device 100 returns to normal operation.

In another embodiment of the present disclosure, the BAN signal may be transmitted through the transmission medium, a biological body (driver 90), using an electromagnetic signal instead of a capacitive signal.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

What is claimed is:

1. A method for restricting the use of a portable electronic device, the method comprising:
   transmitting a signal configured to be transmissible over a body area network (BAN) using a vehicle device, wherein the signal includes vehicle information;
   receiving the signal at the portable electronic device through a receiver in the device, the receiver receiving the signal after transmission through the BAN; and
   carrying out an action responsive to the received vehicle information,
   wherein the BAN comprises a biological medium as a signal transmission path, and the biological medium is a human in the position of a passenger of the vehicle.

2. The method of claim 1, wherein the BAN comprises transmission of the signal as a capacitive signal.

3. The method of claim 1, wherein the signal is a passenger restricted mode signal.

4. The method of claim 3, wherein the passenger restricted mode signal disables camera functionality on the portable electronic device.

5. The method of claim 1, wherein carrying out an action stores the signal on the portable electronic device.

6. The method of claim 1, wherein carrying out an action issues an alert on the portable electronic device indicating that the portable electronic device will be entering a restricted mode.

7. The method of claim 1, wherein carrying out an action restricts functionality of the portable electronic device.

8. The method of claim 7, wherein restricting functionality includes disabling at least one communication-related function of the portable electronic device.

9. The method of claim 8, wherein restricting functionality locks out communication functions of the portable electronic device except for emergency service communications.

10. The method of claim 1, wherein the transmitting occurs in response to determining that the vehicle is operating.

11. The method of claim 10, wherein determining that the vehicle is operating comprises receiving a signal indicative of vehicle operation.

12. The method of claim 11, wherein the signal indicative of vehicle operation is a signal indicating that the vehicle is in gear.

13. A system for restricting the use of a portable electronic device in a vehicle, comprising:
   a vehicle device within the vehicle, configured to transmit a body area network (BAN) signal, the vehicle device including
      a BAN electrode mounted in the vehicle in a location having close proximity to a driver, wherein the driver is operating the vehicle; and
      a controller connected to the BAN electrode and configured to generate and transmit the BAN signal through the BAN electrode, wherein the BAN signal includes vehicle information and instructions for restricting a phone application associated with the portable electronic device to hands-free operation.

14. The system of claim 13 wherein the vehicle device is configured to generate an electric field generated by applying voltage to the electrode.

15. The system of claim 13, wherein the signal is a warning signal to indicate that the portable electronic device will be entering a restricted mode.

16. The system of claim 13 wherein the signal is a timing signal.

17. The system of claim 13 wherein the signal is a passenger-restricted mode signal.

18. The system of claim 13 wherein the signal is a driver-restricted mode signal.

19. A portable electronic device comprising:
a processor;
a receiver, connected to the processor, and configured to receive a body area network (BAN) signal via a body area network;
a phone application;
a driver lock-out module having computer-executable instructions which, when executed, configure the processor to:
 detect receipt of the BAN signal at the receiver, the BAN signal including vehicle information; and,
 in response to detection of receipt of the vehicle information signal, restrict the phone application to hands-free operation.

20. The portable electronic device of claim 19, wherein the driver lock-out module configures the processor to disable at least one communication function in response to detection of the BAN signal.

21. The portable electronic device of claim 19, further comprising a device casing, and wherein the receiver includes an electrode having at least a portion exposed through an aperture in the device casing.

22. A vehicle device for restricting the use of a portable electronic device in a vehicle, comprising:
a BAN electrode mounted in the vehicle in a location having close proximity to a biological medium; and
a controller connected to the BAN electrode and configured to generate and transmit a BAN signal through the BAN electrode, wherein the BAN signal includes vehicle information and instructions for restricting a phone application associated with the portable electronic device to hands-free operation.

23. The vehicle device of claim 22, configured to generate an electric field generated by applying voltage to the electrode.

24. The vehicle device of claim 22, further comprising a BAN transceiver.

25. A method for restricting the use of a portable electronic device, the method comprising:
receiving, at a vehicle device, an indication that the vehicle is in operation; and
in response to receiving the indication, transmitting a signal configured to be transmissible over a body area network (BAN) using the vehicle device to the portable electronic device; wherein the BAN signal includes vehicle information and instructions for restricting a phone application associated with the portable electronic device to hands-free operation.

26. The method of claim 25 wherein the body BAN comprises a biological medium as a signal transmission path.

27. The method of claim 26, wherein the BAN comprises transmission of the signal as a capacitive signal.

28. The method of claim 27 wherein the biological medium is a human in the position of a driver of the vehicle.

* * * * *